Nov. 13, 1962

J. L. HILL ETAL 3,064,242

MAGNETIC RECORD SENSING APPARATUS

Filed April 11, 1957

3 Sheets-Sheet 1

INVENTORS
JOHN L. HILL
JOHN A. ENGSTROM, JR.

BY Cushman, Darby & Cushman
ATTORNEYS

Nov. 13, 1962 J. L. HILL ETAL 3,064,242

MAGNETIC RECORD SENSING APPARATUS

Filed April 11, 1957 3 Sheets-Sheet 2

INVENTORS

JOHN L. HILL

JOHN A. ENGSTROM, JR.

BY Cushman, Darby & Cushman

ATTORNEYS

Nov. 13, 1962 J. L. HILL ETAL 3,064,242

MAGNETIC RECORD SENSING APPARATUS

Filed April 11, 1957 3 Sheets-Sheet 3

INVENTORS
JOHN L. HILL
JOHN A. ENGSTROM, JR.

BY Cushman, Darby & Cushman
ATTORNEYS

United States Patent Office 3,064,242

Patented Nov. 13, 1962

3,064,242

MAGNETIC RECORD SENSING APPARATUS

John L. Hill, North St. Paul, and John A. Engstrom, Jr., Minneapolis, Minn., assignors to Sperry Rand Corporation, New York, N.Y., a corporation of Delaware Filed Apr. 11, 1957, Ser. No. 652,207
4 Claims. (Cl. 340—174.1)

This invention relates to magnetic recording systems and specifically to improved apparatus for sensing binary encoded information recorded on magnetic record mediums.

In recording binary encoded information on magnetic record mediums, it is desirable to record hundreds of binary digits (bits) per linear inch of track length wherein a track is the record medium area normally associated with one recording head. The record medium for digital recording is preferably one exhibiting the well known rectangular hysteresis loop. Information is recorded on said medium by magnetizing small areas of the magnetic surface, which may conveniently be termed cells, to one of two levels, one level of which is arbitrarily designated as representing a "1" and the second a "0". The number of these small areas resolvable in one linear inch of a track length can be conveniently referred to as the pulse packing density.

It may be said in general that as the pulse packing density is increased, the restricted resolving power of the recording head and magnetic medium requires a more perceptive reading system for reliable recovery of recorded information. In connection with sensing for information recorded at a high pulse packing density using the well known return-to-zero technique, a recurring problem is that of recovering the "1" signal in presence of large variations in magnetic flux densities due to various amplitude and pulse-spacing effects. Among other things the fringing effect of the flux becomes an important consideration in attempting to recognize the recorded information. As the pulse packing density is increased, the voltage amplitude of the first "1" signal readback in a series of "1" signals becomes larger with respect to the successive "1" signals.

Since magnetic reading circuits are often designed to recognize a signal as a "1" when the amplitude of the signal from the sensing head reaches an arbitrary amplitude level such as a predetermined percentage of the anticipated peak amplitude, it is apparent that as the pulse packing density is increased, the fringing effect of the flux of "1's" in "0" areas, will give an inaccurate indication of the recorded signal. That is, when a recorded "0" is folllowed by a recorded "1", the encroachment of the "1" flux on the "0" cell, as the pulse packing density is increased, becomes large enough that the arbitrary amplitude level of the readback signal is reached in the "0" cell. The same is true for "0" cells following "1" cells, although the readback signal is then negative. To prevent such erroneous indication of "1's" when in fact a "0" is recorded, this invention provides means to produce a signal substantially time coincident with the peak of the recorded flux for a "1" signal. Since the point of greatest magnetization in a cell is generally close to the center of the cell, the signal produced thereby is almost invarient timewise, whereas a signal produced by a readback voltage reaching a predetermined amplitude level is subject to perturbations which may not be resolved with great enough accuracy to prevent erroneous indications. Variations in the amplitude of the recorded flux intensities as well as in the amplitude of the readback signals for successive cells is immaterial since the peak flux intensity signal is produced at substantially the time when each cycle of readback voltage crosses its zero axis within the associated cell time therefor. In fact, in accordance with this invention the central zero axis crossing of the readback voltage is mainly responsible for producing the output signal at substantially the time of peak flux intensity. To accomplish this result, a voltage amplitude discriminating circuit is employed to switch to a first state upon the rise to a given level of the input signal and to switch back to a second state upon reduction of the input signal below said arbitrary level and to zero volts at which time the peak flux intensity signal is produced.

When a plurality of parallel magnetic tracks in each of which are stored a plurality of bits commonly referred to as a "level" of information, is to be sensed in such a manner that the cells in a row thereof transverse to the tracks are to be read simultaneously, the record medium is subject to misalignment with respect to the reading heads: that is, the record medium may be skewed. Normally, along with the different tracks or levels of information, there is a separate track on the record medium which has all "1's" recorded therein and is generally termed the timing or index track since it is used to locate the information in the other tracks accurately. The desired result is generally that the information pulses and the index pulse be sensed at identical times, i.e., in parallel. However, as pointed out, as the record medium moves with respect to the reading heads, the medium may be subject to skew thereby misaligning the recorded information with respect to the reading heads. The signals thereby produced from the respective tracks are not time coincident and may further be subject to the above mentioned types of signal perturbations. To obviate the effects of skew whether present because of record misalignment during playback or during recording, as well as the aforementioned types of signal perturbations, this invention encompasses the use of a discriminating circuit of the type above mentioned with each of the tracks on the record medium. The peak flux intensity signal produced from the index track is utilized after a predetermined time to gate the outputs from the different information tracks so as to cause an indication of the binary recordings therein simultaneously. Tolerance is thereby provided so that the signal perturbations including that resulting from mechanical misalignment will provide accurate output signals without possibility of an erroneous indication of the magnetic recording.

Therefore, it is the principal object of this invention to provide magnetic record sensing apparatus which senses data reliably despite time perturbations in the readback signals.

It is another object of this invention to provide magnetic record sensing apparatus which is substantially independent of signal amplitude variations and skew.

It is another object of this invention to provide magnetic record sensing apparatus capable of reliably sensing magnetic records having an excessively high pulse packing density.

Another object of this invention is the provision of magnetic record sensing apparatus employing a voltage amplitude discriminating circuit having a hysteresis input-output voltage characteristic for providing a signal at substantially the peak of magnetic flux intensity of given recorded magnetizations.

A further object of this invention is the provision of magnetic record sensing apparatus having a plurality of tracks, one of which is an index track, there being associated with each of the tracks a voltage amplitude discriminating circuit having a hysteresis input-output voltage characteristic for producing a signal substantially time coincident with peak flux intensity of the given magnetic recordations with such signal from the index track acting after a time delay to gate such signals from the other tracks substantially simultaneously.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

As a record medium track passes in proximity to a transducer or reading head, the first derivative (with respect to time) of flux intensity on the track is present at the terminals of the transducer as a fluctuating voltage readback signal. That is, the time rate of change of the flux intensity recorded on the record track induces a voltage in the conventional winding associated with the reading head. The invention may be used advantageously with either "biased" or "neutral" record mediums. As is well known, a biased record medium is the result of magnetically polarizing the medium a predetermined amount before actually recording information thereon, while a neutral record medium is in a non-polarized magnetic state before recording thereon. With a biased record medium, the amount of magnetic bias may arbitrarily be assigned the "0" state. Information is then recorded by changing the level of magnetization momentarily to represent a binary "1." In a neutral record medium, a "1" is defined as an area magnetically polarized in one direction, while a "0" is defined as an area magnetically polarized in an opposite direction. The readback signal developed by movement of the record relative to a transducing head, is similar for both types of record mediums. An increase of flux to maximum positive and back in either case produces a complete cycle of induced E.M.F. as the readout signal. With the biased record medium, no signal is induced for a "0" state of magnetization. However, with a neutral record medium, wherein "0" polarization extends from zero flux intensity to maximum negative flux intensity and back again to zero, a signal is induced in the output winding of a reading head for a "0." Since a "0" area in a neutral record medium is negatively magnetized rather than positively magnetized as is a "1" area, the E.M.F. induced in a reading head output winding for a "0" output signal is 180° out of phase with a "1" signal.

Figure 1:
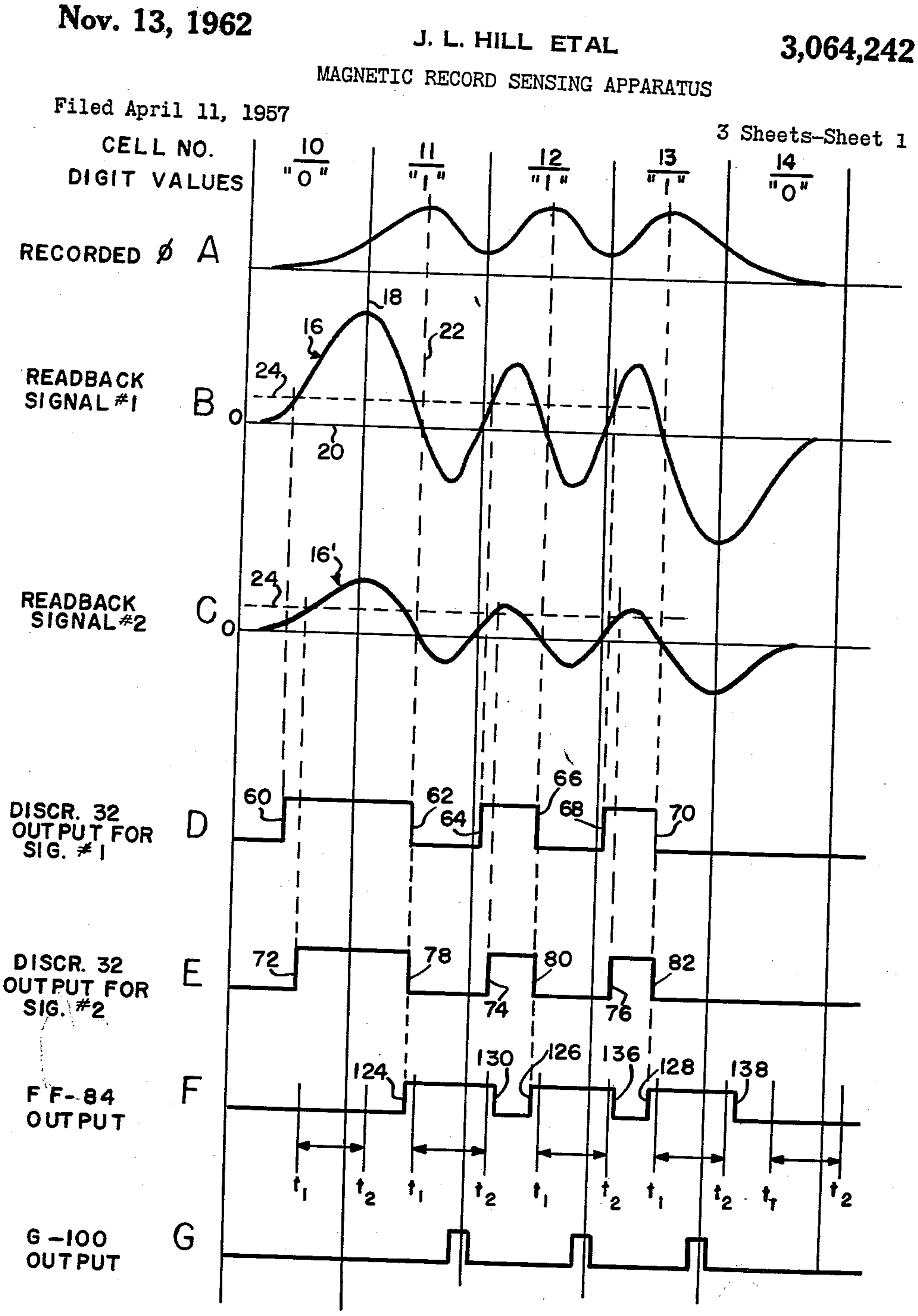
FIGURE 1 shows typical signals associated with the circuitry of FIGURE 2.

Because either no signal is induced in a reading head output winding for a "0" magnetic area on a record medium, or is induced 180° out of phase, the invention may be employed to prevent ambiguities between "0's" and "1's" in detecting readback signals from either a biased or neutral record medium. With reference to FIGURE 1, line A is representative of the flux intensity recorded in successive cells numbered 10, 11, 12, 13 and 14, in the direction of record movement with respect to a reading head (not shown), cell 10 being sensed first while cell 14 is sensed last. The binary digit values represented by the flux distribution for each cell are respectively 01110 as indicated. As the pulse packing density increases so as to narrow the length of each cell, the first and last cells of a group of cells having "1's" recorded therein will effectively "spill" or "overflow" into the adjacent "0" cells to a larger degree. That is, the area for a "0" when adjacent to (i.e., contiguously preceding or succeeding) a "1" area will have some flux therein due to the encroachment of the flux in the adjacent "1" cell. Because of such encroachment, the E.M.F. induced in a reading head begins or ends in a "0" cell. Line B of FIGURE 1 shows a typical voltage readback signal. Since cell 11 is magnetically polarized to a "1" and cell 10 is "0," the signal waveform 16 produced in a reading head begins in cell 10 and reaches maximum near the border line 18. The wave 16 returns to the zero axis 20 at the same instant of time that the intensity of the flux in cell 11 reaches maximum. Assuming such maximum to be in the center of the cell, waveform 16 intercepts not only zero axis 20, but the central vertical cell axis 22 concurrently. However, it is to be understood that the point of peak magnetic flux intensity in cell 11 may be somewhat to the right or left of the cell center line 22, and that waveform 16 will cross zero axis 20 at a corresponding time. The return of the flux intensity in cell 11 from maximum toward zero induces a negative E.M.F. as shown in the latter half of cell 11, line B of FIGURE 1. The subsequent rising of the flux intensity in the first half of cell 12 induces a positive half-cycle signal, as does the rising of the flux in the first half of cell 13. It will be noted that the amplitudes of the signals in the first halves of cells 12 and 13 as well as in the last halves of cells 11 and 12 are equal, while the amplitudes for the positive signal before the center of cell 11 and the negative signal after the center of cell 13 are much larger. This is because the "1" cells 11 and 13 are not adjacent on their left and right sides respectively to a "1" cell, whereas the "1" in cell 12 is bordered on both sides by "1" cells. The mutual fringing effect of the adjacent "1" cells 11, 12 and 13 varies as to the pulse packing density and is usually such as to prevent full return to zero of the flux between cells. In any case the time in which the flux changes from minimum to maximum in cells 12 and 13 is substantially equal, as is the time in which the flux changes from maximum to minimum in cells 11 and 12. Therefore, the amplitudes of the positive readback signals in cells 12 and 13 are approximately equal as are the negative signals in cells 11 and 12.

As previously mentioned, sensing of the magnetization on a record medium is conventionally accomplished by considering the medium to represent a "1" when the readback signal is above an arbitrarily chosen amplitude, while when below such amplitude, a "0" is represented. From the inspection of line B of FIGURE 1, it will be apparent that regardless of what the arbitrary amplitude may be, it will be reached in cell 10, if the arbitrary amplitude level is positive or in cell 14 if the arbitrary level is negative. This invention, however, allows an arbitrary amplitude to be utilized without possibility of ambiguity between the interpretation of the readback signals for "0's" and "1's". The invention also prevents incorrect interpretation of flux intensities which may vary considerably in magnitude but still represent "1's." Also, the invention compensates for any mechanical misalignment of the record relative to the transducers such as skew produced during recording or occurring during playback.

For purposes of comparison, a second readback signal 16' is shown in line C of FIGURE 1 with amplitudes considerably less than waveform 16 of line B. The binary representations for the respective cells are the same as previously indicated. The amplitude level arbitrarily chosen for the developed readback signals in lines B and C is shown by dotted lines 24 and may be, for example, a level corresponding to 16% of peak amplitude, no limitation thereto being intended. In both lines B and C of FIGURE 1, the arbitrary amplitude level is reached in cell 10, and with conventional systems there would be a "1" indication therefrom, whereas in fact a "0" is recorded.

Figures 2, 3:
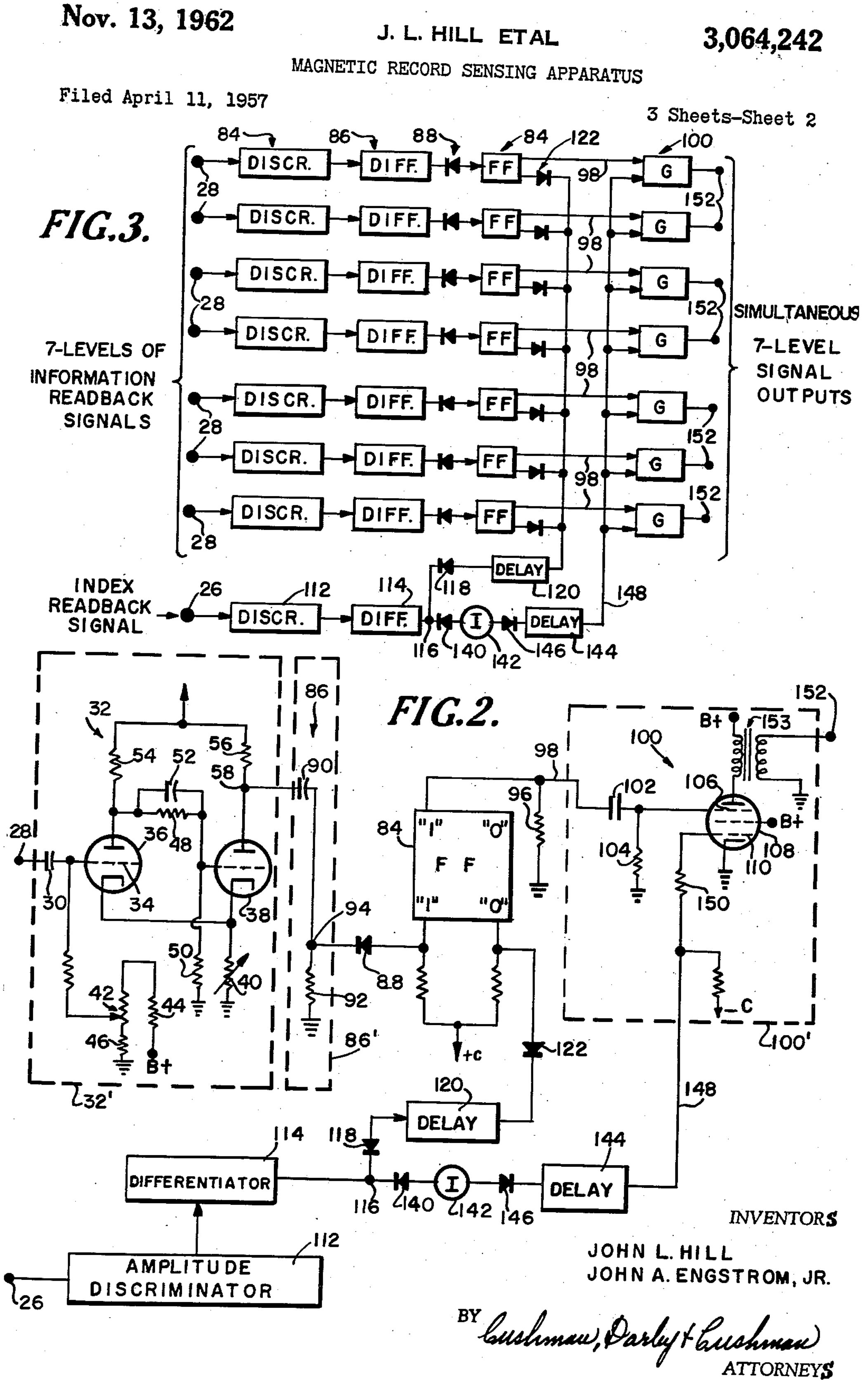
FIGURE 2 illustrates the invention schematically and in block diagram as it may be employed with two tracks of a record medium.
FIGURE 3 illustrates the invention in block diagram form as it may be employed with a seven-level magnetic record medium.

To prevent such incorrect indications, this invention provides apparatus such as illustrated in FIGURE 2. Since most record mediums have one of the tracks therein designated as a timing or index track, in which adjacent areas or cells are all similarly magnetically polarized, i.e., all "1's," the circuitry in FIGURE 2 is designed to operate with such a record medium. The fluctuating readback signal as developed from the recorded variations of flux in the index track is received by terminal 26. Each further track on the record medium may have recordings therein in binary form to represent information. Normally, there are a plurality of such information tracks, but for purposes of illustration, FIGURE 2 shows a circuit for receiving the signal from only one of such information tracks. Assuming that the information track associated with the circuitry of FIGURE 2 is magnetized in the manner shown in line A of FIGURE 1, the signals of either lines B or C may be received by terminal 28 in FIGURE 2. Terminal 28 leads through condenser 30 to a voltage amplitude discriminating circuit which is basically a trigger circuit exhibiting differential triggering action. For simplicity's sake, the voltage amplitude discriminator circuit 32 shown in dash line 32' will be herein termed merely a discriminator. In operation, the discriminator is similar to a bistable trigger circuit which is under the control of a single input signal. When the voltage of the input signal reaches a first level of amplitude from a first direction, the discriminator switches its state of conduction, and when the input signal reaches a second amplitude level from an opposite direction, the discriminator changes back to its other state of conduction.

More specifically, when the input signal of either lines B or C increases to the arbitrary level represented by dotted line 24, grid 34 of triode 36, which receives one of such input signals, becomes increasingly positive causing the discriminator 32 to switch conduction from triode 38 to triode 36. Upon a reduction of the input voltage back to the amplitude represented by line 24, conduction between the triodes 36, 38 does not change. That is, line 24 does not represent the amplitude at which the discriminator switches from its second state back to the first state, although line 24 does represent the amplitude that the circuit switches from its first stable state to its second stable state. To switch the discriminator circuit back to its first stable state, i.e., to tube 38 conducting, the input signal must be reduced below the amplitude represented by line 24. The amount that the input needs to be reduced below line 24, so as to cause waveform 16 to cross the zero axis 20 at the peak of flux intensity time represented by line 22, is similar to the voltage represented by the distance between lines 20 and 24, i.e., when waveform 16 reaches zero volts, conduction of tube 38 begins again and conduction of tube 36 ceases. The difference in potentials of the input voltage at which the circuit changes states is generally referred to as the "backlash" or "hysteresis" voltage (because of the hysteresis loop type characteristic of the circuit's input-output voltages), and may be varied to produce the desired results by changing the size of the common cathode resistor 40. The voltage represented by line 24 may be set by varying potentiometer 42 which is connected at one end through resistor 44 to a positive voltage B+, and at its other end through resistor 46 to ground potential. As the variable tap of potentiometer 42 is moved toward ground, the threshold voltage amplitude level (line 24) is raised, whereas movement of the variable tap toward B+, decreases the threshold level. The threshold level, frequently termed the reference or bias voltage, may also be varied by varying the ratio between resistors 48 and 50 which provide a voltage dividing circuit for the grid of triode 38. Condenser 52 parallels resistor 48 so as to by-pass the resistor and speed up operation of the triggering between states. Resistors 54 and 56 are plate load resistors which connect to the positive potential B+.

As previously mentioned, the voltage amplitude discriminating circuit 32 is basically a differential trigger circuit and as illustrated is similar to the Schmitt trigger circuit described in "Electronics" by Elmore and Sands (Vol. 1, McGraw-Hill, 1949), beginning at pages 99 and 202. The Schmitt trigger circuit is also fully described, particularly as to its operation, in "Introduction for Circuit Techniques for Radio Location," by F. C. William in Journal IEE, 1946, Vol. 93, Part IIIA, No. 1 at page 289. Other amplitude sensitive bistable circuits which operate with a hysteresis effect as to their input-output voltage characteristic may be used in place of the Schmitt trigger circuit illustrated. For example, the Evan's trigger circuit described on page 80 of the book "Time Bases," by O. S. Puckle (Wiley, second edition, 1951) is suitable as is the circuitry of FIGURES 6 and 7, for example, of the W. M. Goodall patent, No. 2,773,981.

The operation of the particular amplitude discriminator 32 illustrated in FIGURE 2 will now be explained in more detail. When the input signal of either line B or C of FIGURE 1 is first received by terminal 28 of the discriminator, triode 38 is conducting current so as to cause the signal level of junction 58 to be comparatively low. However, when the input signal reaches the arbitrary amplitude level represented by line 24, conduction switches to triode 36 and junction 58 increases in potential. Re-switching of the circuit by a reduction of the input signal below line 24, causes junction 58 to return to a relatively less voltage. The output signal at junction 58 is shown in lines D and E of FIGURE 1 for the different input signals B and C respectively. With reference to FIGURE 1, it will be apparent that when the increasing portions of waveform 16 of line B cross the dotted line 24, the signal level of line D sharply increases. The reduction of waveform 16 to the central zero axis crossing of the cycle of E.M.F. produced by the flux in cell 11 causes the rectangular wave of line D to sharply reduce. Therefore, the leading edge 60 corresponds to the crossing of the input wave 16 with the arbitrary amplitude level 24, while the trailing edge 62 of the rectangular wave corresponds to the zero axis crossing of wave 16. The negative portion of wave 16 in cell 11 causes no output at junction 58. When the input signal of line B goes positive in cell 12 and again crosses the arbitrary amplitude level 24, the output at junction 58 again rises sharply to cause the leading edge 64. The subsequent reduction of the input signal below the level 24 to the central zero axis crossing causes the sharply reduced trailing edge 66 in the waveform of line D. Likewise, leading edge 68 and trailing edge 70 are caused by the two levels of the input signal wave 16 in cell 13. Since cell 14 does not contain a positive voltage fluctuation which reaches the amplitude level 24, no output is present at junction 58 during that time.

The waveform 16' of line C of FIGURE 1, as above explained, is for illustrative purposes shown to be of lesser amplitude than the waveform of line B, but may be induced by flux variations similar to those shown in line A. When the waveform 16', while it is increasing, crosses the arbitrary amplitude level 24, the leading edges 72, 74 and 76 of line E are produced in the voltage waveform present at junction 58 for the respective cells. The subsequent decrease of the input signal waveform 16' below the level 24 to the central zero axis crossings of the respective cells causes the trailing edges 78, 80 and 82 respectively.

It is to be noted from the comparison of lines D and E of FIGURE 1 as related respectively to lines B and C thereof, that the leading edges of the rectangular waves present at the junction 58 are subject to considerable variance, but that the trailing edges of the waves occur approximately at the same time regardless of any signal perturbations. That is, the trailing edges 62, 66, 70 and 78, 80 and 82 all occur at substantially the instant of time when the flux intensity for the respective cells is at a peak, which time corresponds to the time when the input signals 16 and 16' cross the zero axis in the center of each of their like phased cycles. Since the trailing edges of the rectangular waves of lines D and E occur at substantially invarient times, it is these edges which are used to produce a signal for indicating a recorded "1" output from the circuit.

From the foregoing it is apparent that discriminator 32 operates to detect substantially the cell-centered reduction of the fluctuating readback signal to the zero axis, or the substantially cell-centered zero axis crossing of that signal as it changes polarity in one direction only. With regard to the zero axis crossing operation, this discriminator-detector, as so used, may therefore be generally referred to as exhibiting polarity-change detection abilities.

With reference again to FIGURE 2, it will be noted that junction 58 is connected to a flip-flop 84, which may be of conventional form, through differentiating circuit 86 shown in dash-lined box 86' and through rectifier 88. The differentiating circuit 86 may include condenser 90 and resistor 92 serially interconnected by junction 94 for connection to rectifier 88. Both the leading and trailing edges of the output wave at junction 58, such as the wave in line D of FIGURE 1 or the wave in line E thereof, are differentiated by circuit 86 to cause both positive and negative "spikes" across resistor 92. As mentioned above, it is more desirable to use the trailing edges of the rectangular waveforms of lines D and E of FIGURE 1, and, therefore, rectifier 88 is polarized to pass only the negative differentiating spikes to provide an input signal to the "1" input terminal of flip-flop 84. Such a signal thereat causes an output signal across resistor 96 which is presented via line 98 to gating means 100 shown within dash-lined box 100'. The output signal on line 98 partially enables the gating means by presenting through condenser 102 and resistor 104 a signal of proper amplitude for operation of the suppressor grid 106 in the pentode type gating tube 108. For full enablement of the tube, a signal needs to be present on the control grid 110 of the tube concurrently with a relatively positive signal from line 98. The control grid signal is developed in the following manner.

As previously mentioned, terminal 26 of FIGURE 2 receives the fluctuating readback signal from an index track on the record being read. Terminal 26 is connected to an amplitude discriminator 112 which is preferably similar in all aspects to the discriminator 32 previously described. The output of the discriminator 112 is connected through a differentiating circuit 114, preferably similar to circuit 86, to junction 116. It will be apparent from the above discussion that the waveform at junction 116 will consist of alternate positive and negative spikes which because of the all "1's" recorded in the successive areas on the index track, will recur cyclically. It is to be understood that because there are no signal perturbations developed due to transitions from "0" to "1" and vice versa in the index track, either the positive or negative periodically recurring differentiating signals at junction 116 may be utilized. However, because of possible signal perturbations due to skew, and because a more elaborate system would be necessary to employ the positive differentiating signals present at junction 116, the negative differentiated signals are preferably utilized. Therefore, rectifier 118 allows presentation of only the negative signals to the delay line 120. After a predetermined period of delay, the signal output of delay line 120 is presented to the "0" input side of flip-flop 84 in a negative sense by rectifier 122. With reference to line F of FIGURE 1, which line shows the waveform of the output present on line 98 from flip-flop 84, it will be apparent that any of the differentiated trailing edges of lines D or E act on flip-flop 84 to increase the output level thereof. This is shown by the leading edges 124, 126 and 128 in line F of FIGURE 1. The signal from delay line 120 of FIGURE 2 switches flip-flop 84 to its "0" state causing a reduction in the output level on line 98 as indicated in line F of FIGURE 1 by the trailing edges 130, 136 and 138. Gate 100 is fully disabled when the signal level on line 98 is comparatively low.

To cause gate 100 to be fully enabed, a signal to control grid 110 must be present during the comparatively high level of signal on line 98. To obtain the control grid signal concurrently, the negative differentiated signal at junction 116 is selected by rectifier 140. Because the control grid signal is preferably a positive signal, the output of rectifier 140 is inverted by signal inverting means 142, which may be a transformer, for example. The output of the inverter is then applied to a second delay line 144 through another rectifier 146 which assures only the presence of positive pulses in delay line 144. The period of delay of delay line 144 is set to be less than that of delay line 120. In this manner, the output signal from delay line 144 as present on line 148 is delivered thereby to control grid 110 through grid resistor 150 during the time that the signal on line 98 may have a comparatively high level. Therefore, the two signals on line 98 and 148 when concurrent, allow conduction through tube 108 to provide a positive pulse on terminal 152 through transformer 153. The presence of a pulse on terminal 152 indicates a "1" has been detected in the information track associated with input terminal 28, while the absence of a pulse at terminal 152 indicates that a "0" has been detected. This is indicated in line G of FIGURE 1 with the solid line pulses therein being the "1" output pulses, while the absence of such pulses for cells 10 and 14 represent the presence of a "0" recordation. From FIGURE 1, it will be noted that the gated output pulses of line G occur between the leading and trailing edges of the rectangular waves of line F and preferably between the time domains indicated by times $t_1$ and $t_2$ for each high level of output from flip-flop 84 as present on line 98. The times $t_1$ and $t_2$ should be designed to accommodate the maximum expected time perturbations. Time $t_1$ is limited on its left, i.e., the earliest occurrence thereof, approximately by the central zero axis crossing of the input waves 16 and 16', while the latest time that $t_1$ may occur is ascertainable by the greatest expected time perturbation which causes a delayed index signal on line 148 to be furthest advanced with respect to the information readback signal. Times $t_2$ should occur before the latest time the delayed index signal on line 148 is expected to occur with respect to the information readback signal. Of course, tolerance should be allowed to insure maximum reliability. However, even with desired tolerance, the time duration between times $t_1$ and $t_2$ is sufficient to allow considerable tolerance for skew.

Although the gating means illustrated in FIGURE 2 within dashed line 100' is a two input, suppressor-control grid type gate, limitation thereto is not intended since any other conventional two input gating means may be utilized therein as well as in FIGURE 3.

FIGURE 3 is a block diagram of a record sensing system for recovering seven levels of information according to the principles of this invention. Each of the information track readback signals are presented respectively to the input terminals 28 of the discriminator 32. The outputs of the discriminators are respectively differentiated in circuits 86 and properly rectified to set the respective flip-flops 84. The output of flip-flops 84 are applied respectively to the gating means 100 for partial enablement thereof. For complete enablement of the gates 100, the signal from the index track as received at terminal 26 triggers the discriminator 112 which provides an output for differentiating circuit 114. As explained above, the differentiating output is rectified, inverted and delayed to provide a partial enabling signal on line 148 for gates 100. The gates, which are partially enabled by an output from their respective flip-flops 84, upon receipt of the delayed signal on line 148 provide a simultaneous output to terminals 152 to indicate the presence of a "1" in the associated information track. Following an output on line 148, the negative differentiated pulses developed from the index track after being delayed in delay line 120 are applied simultaneously to each of the flip-flops 84 to switch the flip-flops to a state whereby the signal level on their output lines 98 is comparatively low.

From FIGURE 3, it is apparent that not only are the ambiguities due to signal perturbations caused by recordings in adjacent cells changing from "0" to "1" or vice versa in the information tracks eliminated as well as are those caused by variations in recorded "1" flux intensities and/or in readback signal amplitudes, but also the system has improved tolerance to mechanical misalignment or skew. The skew may have an angle as great as that corresponding to the time duration between times $t_1$ and $t_2$ in line F of FIGURE 1 without resulting inaccuracies in the final signal outputs.

Figures 4, 5, 6, 7:
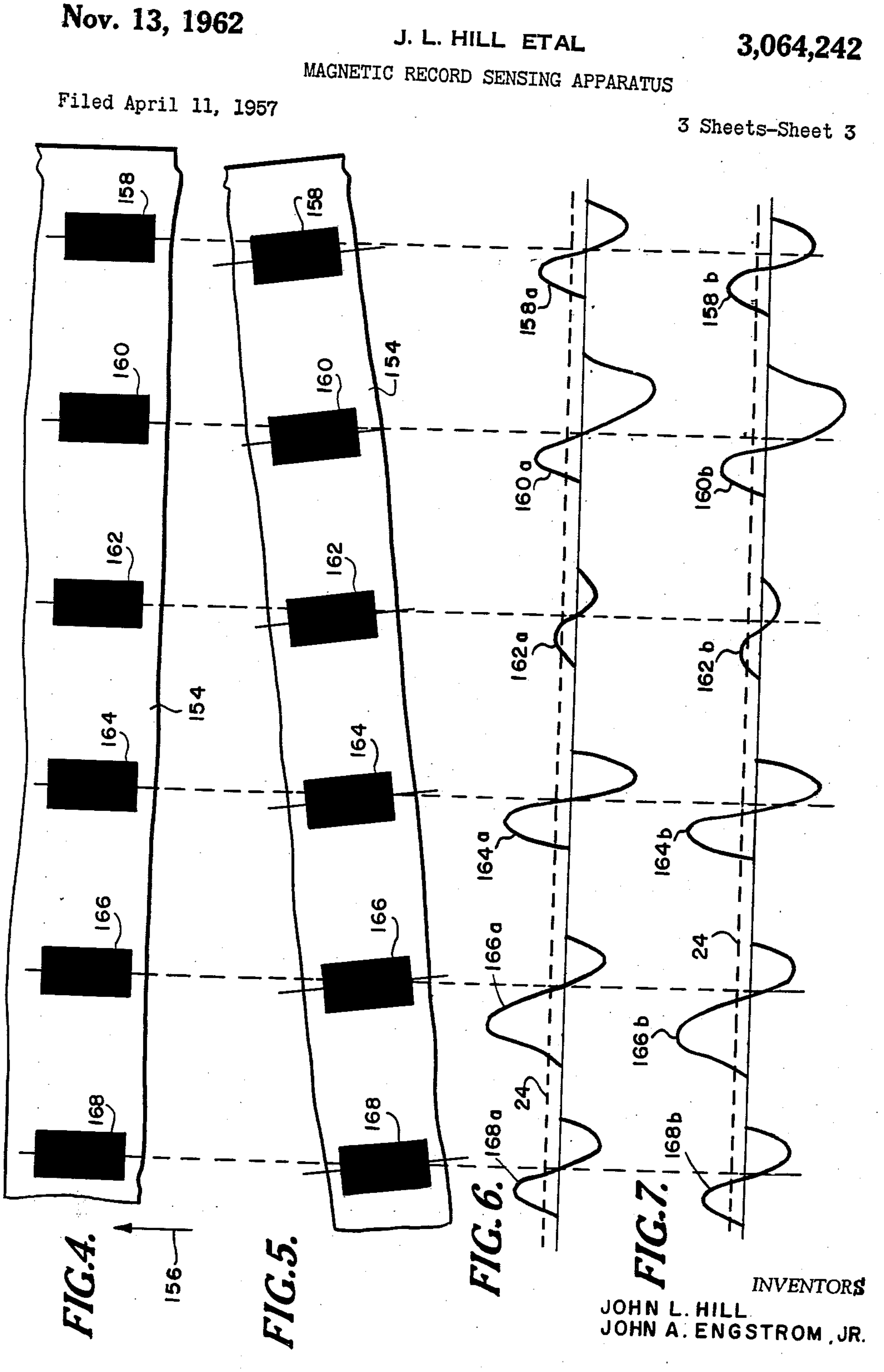
FIGURE 4 illustrates a partial transverse section of a record medium without misalignment.
FIGURE 5 illustrates the record medium of FIGURE 4 with some skew.
FIGURE 6 illustrates waveforms associated with the record of FIGURE 4.
FIGURE 7 illustrates waveforms associated with the skewed record of FIGURE 5.

FIGURES 4, 5, 6 and 7 illustrate the versatility of the invention with reference to signal perturbations of all types referred to herein. In FIGURE 4, a partial plan view of a transverse section of a record medium 154 is shown. The record may be assumed to be moving in the direction of arrow 156 in perfect mechanical alignment with reading heads (not shown). The record medium 154 may also be assumed to be a part of an eight track record which has an index track at its extreme right, with seven information tracks successively to the left thereof. The magnetization represented by the darkened area 158 is a "1" in the index track, and the darkened areas 160, 162, 164, 166 and 168 are "1's" in adjacent tracks of longitudinal cells having the same transverse number designation. That is, all of the magnetizations on record medium 154 may be like any one of the "1" cells shown in line A of FIGURE 1. The broken section of the record medium 154 of FIGURE 4 is shown also in FIGURE 5 but skewed with respect to the reading transducers. It should be remembered that instead of the record member being skewed during readback, this invention is also applicable to records which were recorded with some mechanical misalignment so as to cause skew corresponding to the skew shown in FIGURE 5. FIGURES 6 and 7 illustrate waveforms which might be associated with the magnetized areas of the records shown in FIGURES 4 and 5 respectively. Since it is assumed that no skew is present in the readback of the record in FIGURE 4, the waveforms of FIGURE 6 cross their zero axis in the middle of the respective cycles at exactly the same time, which time is assumed to represent the maximum of flux intensity created by the different magnetizations in the record. For illustrative purposes, the peak of recorded magnetization may be assumed to be a point at the longitudinal geometrical center of the individual recordings. Therefore, when the record member is at an angle with the reading transducers, the center of the recorded magnetization spots will move slightly off the center lines indicated by the vertical dash lines between FIGURES 4 and 5. The amount that each recorded spot of magnetization moves off center varies progressively as to adjacent recording areas as is clearly shown in FIGURE 5.

Although FIGURE 5 illustrates an exceptionally large degree of skew, it is to be understood that the amount of skew which might normally occur is generally measurable in minutes rather than degrees. Also, it is to be understood that the angular displacement of the tape is not the resultant angular displacement of the readback signal although the two are generally related when other factors, such as the cell lengths, pulse packing density, tape width, and perceptibility of the reading system are held constant. Actually the electrical phase shift may at times be as high as 100° or more while the skew angle is around 10′. FIGURES 4 through 7 are therefore not to be considered as limiting the invention to handling comparatively small phase shift angles or to the skew and phase shift angles being equal. The purposes of FIGURES 4 through 7 will become more apparent in consideration of the following description.

Assuming that the magnetized area 168 is immediately preceded and succeeded by a "1" magnetized area, the waveform **168*a* therefor will be symmetrical about its zero axis in a manner similar to the waveform or cell 12 shown in line B of FIGURE 1. However, since the record member in FIGURE 5 is mechanically misaligned, the signal output therefor as shown by waveform 168*b*, though symmetrical, will be slightly advanced in phase relative to the waveform 168*a*** of FIGURE 6. For the succeeding recordings on the record member of FIGURE 5, the respective output signals progressively increase in phase advance, as may be noted by the central zero axis crossings of the waveforms in FIGURE 7.

The magnetization of area 166 is assumed to be succeeded by a "1" cell, but preceded by a "0" cell. Therefore, the positive lobe of waveforms **166*a* and 166*b* have greater amplitude than their negative portions and encroach on the area of the preceding cell, in the manner explained for cells 10 and 11 of FIGURE 1. The phase advance of the signal 166*b* is greater than that for waveform 168*b* because of greater advance of area 166 in FIGURE 5 than of area 168 therein. The magnetized areas 162 and 164 are assumed to be preceded and succeeded by a "1" cell, but the magnitude of the flux intensity of these areas of magnetization varies considerably from each other and from the norm which is assumed to be that for area 168. Again the phase of waves 162*b* and 164*b* is successively greater. The magnetized area 160 is assumed to be preceded by a "1" cell and succeeded by a "0" cell so as to give the larger trailing negative portion to waveforms 160*a* and 160*b*. The index track area 158 is assumed to have a normal amount of magnetization so as to cause a waveform like wave 158*a* which is considerably advanced in time in the manner shown by wave 158*b*** when the record is skewed like to the degree shown in FIGURE 5.

Even though the phase of the different output signals in FIGURE 7 progressively increases from left to right, while the amplitude of the different signals varies considerably and with some overlap into preceding and succeeding cell areas, it is apparent that the invention operates to obviate such differences and to allow considerable tolerance therefor. That is, regardless of the different amplitudes, phases and flux encroachment on adjacent cells, the discriminator circuits 32 and 112 of FIGURES 2 and 3 operate to provide a signal at the peak intensity of the magnetized area, which peak corresponds to the central zero axis crossing of the resultant readback signals. As long as the amplitude reaches or exceeds the arbitrary level indicated by line 24, the discriminators will operate to give such a peak intensity readback signal so that with the gating system enabled by the delayed index peak signal, the outputs of the different tracks are indicated simultaneously.

As previously mentioned, this invention is operative with either a neutral or biased record medium. In sensing the information from a biased medium the magnetic bias produces no voltage readback signal to indicate a "0," but each of the "1" cells recorded thereover produce like phased cycles of e.m.f. as the readback signal. In sensing the information from a neutral record medium, a "1" readback signal is the same as the signals referred to in lines B and C of FIGURE 1 as well as in FIGURES 6 and 7, but the "0" readback signal is 180° out of phase therewith. Therefore, the positive voltage excursion due to a "0" readback signal occurs during the second half of a cell so as to cause any of the discriminators 32 to switch at approximately the center of a cell and to restore at approximately the end of such cell. The index track delay line 144 is adjusted so that the output thereof occurs prior to the reswitching of the discriminators 32 by any "0" signals from a neutral record medium. The central zero axis crossing for such "0" signals is therefore in a non-responsive phase relationship so as to preclude ambiguity.

Thus it is apparent that there is provided by this invention apparatus in which the various objects and advantages herein set forth are successfully achieved. For example, with a system constructed in accordance with the invention, the pulse packing density on a magnetic medium may be increased conservatively from 128 and more bits per inch to 250 bits per inch of track length without ambiguities or misinterpretation due to any signal perturbations.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. For use with apparatus for sensing the magnetic recordings of a record having a plurality of information tracks and an index track and for producing respective readback signals from all of said tracks, the index track having adjacent areas throughout its length magnetized in the same given binary sense, the information tracks having binary magnetic recordings thereon, the improvement in detection means comprising, for each of said tracks a respective bistable voltage amplitude discriminator having substantially different input threshold magnitudes for switching itself between two stable states for automatically producing an output signal when each of like phased cycles of the respective readback signal crosses its central zero axis regardless of the speed of said record, means respectively coupled to said discriminators for differentiating the said output signals, means including a plurality of combinations of a gate and respective flip-flop coupled at its output to the input of the respective gate, which combinations are respectively coupled to all of said differentiating means except that coupled to the index track discriminator, the said output signals as differentiated by the respective said differentiating means acting thereby to switch the respective flip-flops to a first state and thereby partially enabling the respective gates, delay means responsive to the differentiated signal associated with the index track for switching each of said flip-flops to a second state at a predetermined delayed time thereby disabling the gates associated therewith, and means including second delay means for delaying the said differentiated output signal associated with the index track a time effectively less than said predetermined time and delivering the so-delayed signal to each of the gates for partial enablement thereof respectively, said gates being respectively fully enabled by concurrence thereat of said partial enablements.

2. In apparatus for sensing magnetically recorded indicia,

*a.* means for receiving a fluctuating readback signal at the same time and in the same shape as said readback signal is developed from the recorded indicia,
*b.* circuit means coupled to said receiving means,
*c.* said circuit means being shiftable from a first state to a second state in response to said readback signal only when said readback signal is increased to a first level for producing a first signal,
*d.* said circuit means being shiftable from said second state to said first state in response to said readback signal only when said readback signal is decreased to a second level for producing a second signal,
*e.* said levels being of different absolute values by a predetermined amount,

*f.* one of the changes between said first and second signals occurring substantially at the time when the central part of given cycles of said readback signal first reaches its zero voltage level,
*g.* and means responsive to said one of said changes between said first and second signals for producing an indication of certain recorded indicia in substantial time coincidence with the zero axis crossing.

3. A skew compensated multi-channel signal recovery system for use with a moving magnetic medium having recorded indicia thereon, said system comprising:

*a.* a plurality of signal recovery channels,
*b.* each channel including a transducer for producing a voltage signal in response to recorded indicia,
*c.* a discriminating circuit coupled to each transducer and being characterized in that a first signal magnitude and polarity output is provided upon receipt of an alternating voltage signal having a first polarity and amplitude and such first output is terminated only when the received voltage signal magnitude reaches approximately its central zero axis,
*d.* separate means in each channel and coupled to the respective discriminating circuits for receiving the signal output and each means being responsive to the zero axis termination of said output for indicating that a first indicia signal is recorded on the medium,
*e.* a plurality of gates connected to all but one of the separate means, and
*f.* the one of the separate means having storage means operative to hold its indication a limited time and after the end of such limited time applying a signal to all of said gates for gating out any of the indications held by the other separate means.

4. In apparatus for sensing magnetically recorded indicia,

*a.* means for receiving a fluctuating readback signal at the same time and in the same shape as said readback signal is developed from the recorded indicia,
*b.* circuit means coupled to said receiving means,
*c.* said circuit means being shiftable from a first state to a second state in response to said readback signal each time and at the instant when said readback signal is increased to a first level for producing a first signal,
*d.* said circuit means being shiftable from said second state to said first state in response to said readback signal each time and at the instant when said readback signal is decreased to a second level for producing a second signal,
*e.* said levels being of different absolute values by a predetermined amount,
*f.* one of the changes between said first and second signals occurring substantially at the time when the central part of given cycles of said readback signal first reaches its zero voltage level,
*g.* and means responsive to said one of said changes between said first and second signals for producing an indication of certain recorded indicia in substantial time coincidence with the zero axis crossing.

References Cited in the file of this patent

UNITED STATES PATENTS

| | | |
|---|---|---|
| 2,698,427 | Steele | Dec. 28, 1954 |
| 2,764,463 | Lubkin | Sept. 25, 1956 |
| 2,793,344 | Reynolds | May 21, 1957 |
| 2,817,829 | Lubkin | Dec. 24, 1957 |
| 2,835,882 | Beek et al. | May 20, 1958 |
| 2,862,199 | Scott | Nov. 25, 1958 |

OTHER REFERENCES

"Waveforms," by Chance, Hughes, MacNichol, Sayre, and Williams, published by McGraw-Hill, First Edition, 1949, pages 187–190 relied on.